United States Patent
Deegan et al.

(10) Patent No.: US 9,662,979 B2
(45) Date of Patent: May 30, 2017

(54) METHOD FOR PRESENTING SAFETY INFORMATION, DRIVER ASSISTANCE SYSTEM AND MOTOR VEHICLE

(71) Applicant: Connaught Electronics Ltd., Tuam, County Galway (IE)

(72) Inventors: Brian Michael Thomas Deegan, Ennis (IE); Patrick Eoghan Denny, Roscam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 14/938,385

(22) Filed: Nov. 11, 2015

(65) Prior Publication Data
US 2016/0129788 A1    May 12, 2016

(30) Foreign Application Priority Data
Nov. 11, 2014   (DE) .......................... 10 2014 116 441

(51) Int. Cl.
| | |
|---|---|
| *G06F 7/00* | (2006.01) |
| *B60K 35/00* | (2006.01) |
| *B60R 1/00* | (2006.01) |
| *B60R 1/04* | (2006.01) |

(52) U.S. Cl.
CPC ................ *B60K 35/00* (2013.01); *B60R 1/00* (2013.01); *B60R 1/04* (2013.01); *B60K 2350/352* (2013.01)

(58) Field of Classification Search
CPC ....... B60R 2300/802; B60R 2300/8093; G01S 13/931; G01B 11/14
USPC ..... 701/1, 36; 340/425.5, 435, 436; 348/806
See application file for complete search history.

(56) References Cited

U.S. PATENT DOCUMENTS

| | | | |
|---|---|---|---|
| 2009/0096937 A1 | 4/2009 | Bauer et al. | |
| 2013/0057690 A1* | 3/2013 | Mitsugi | G08G 1/166 |
| | | | 348/148 |
| 2014/0118551 A1* | 5/2014 | Ikeda | B60R 1/00 |
| | | | 348/148 |

FOREIGN PATENT DOCUMENTS

| | | |
|---|---|---|
| DE | 69524952 T2 | 6/2002 |
| DE | 102007044536 A1 | 3/2009 |

OTHER PUBLICATIONS

German Search Report in corresponding German Application No. 102014116441.5 dated Aug. 21, 2015 (7 pages).

* cited by examiner

*Primary Examiner* — Gertrude Arthur Jeanglaud
(74) *Attorney, Agent, or Firm* — Osha Liang LLP

(57) ABSTRACT

The invention relates to a method for presenting safety information on a display device (4) of a motor vehicle (1), wherein the motor vehicle (1) includes an environment imaging device (5, 6, 7), by which an object (14) in an environmental region (10) of the motor vehicle (1) is pictorially captured, wherein a distortion demonstration (27) is presented on the display device (4) as safety information, which describes a deviation of a distorted mapping (24) of the object (14) causally generated by the environment imaging device (5, 6, 7) to an undistorted mapping (23) of the object (14) compared thereto, wherein at least one distorted mapping (24) is displayed as an image (28) and at least one undistorted mapping (23) is displayed as a further image (29) on the display device (4).

14 Claims, 4 Drawing Sheets

Figure 1:
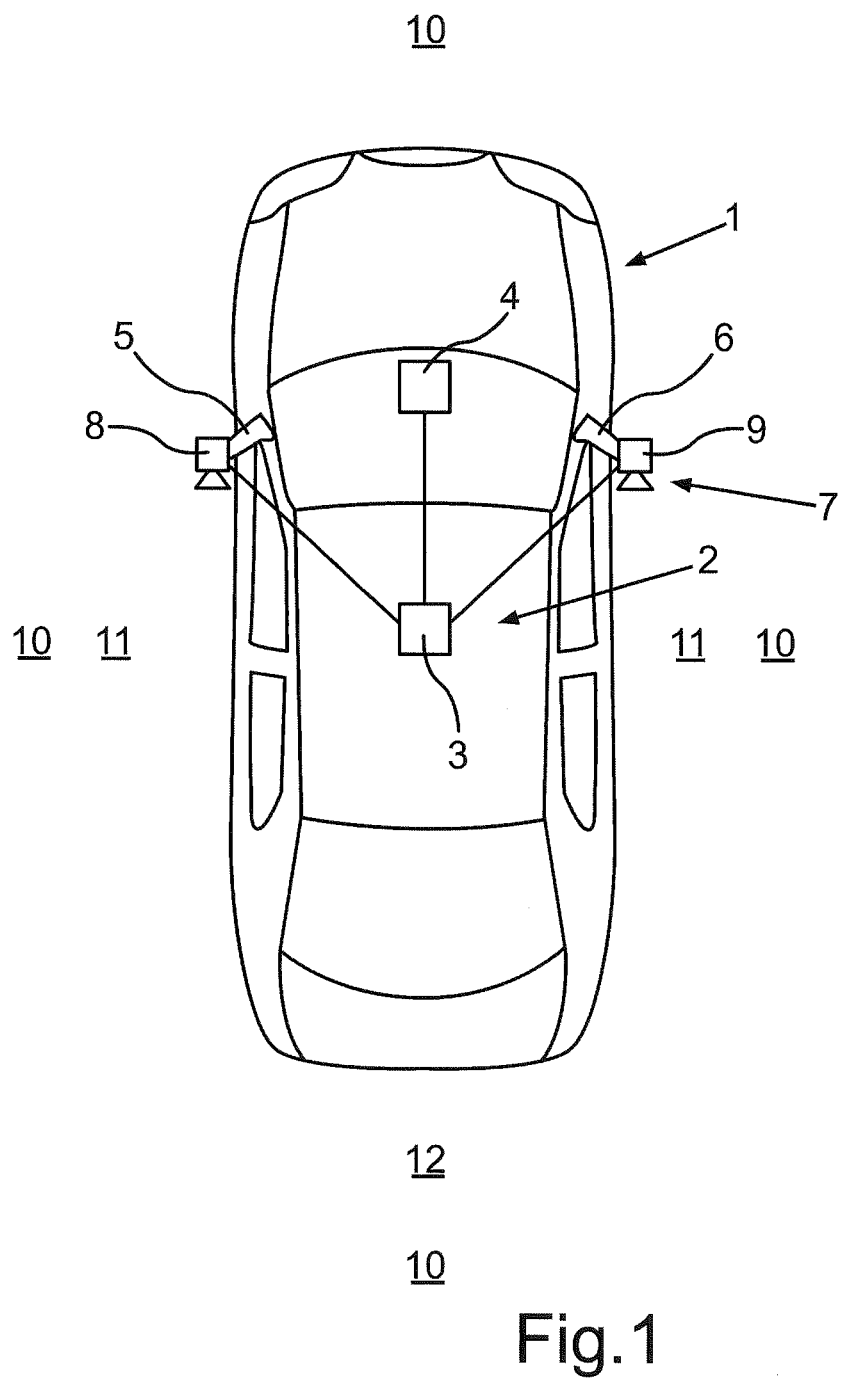

METHOD FOR PRESENTING SAFETY INFORMATION, DRIVER ASSISTANCE SYSTEM AND MOTOR VEHICLE

The invention relates to a method for presenting safety information on a display device of a motor vehicle. The motor vehicle includes an environment imaging device, by which an object in an environmental region of the motor vehicle is pictorially captured. In addition, the invention relates to a driver assistance system for a motor vehicle as well as to a motor vehicle with a driver assistance system.

For example, a rearview mirror of a motor vehicle can be convexly shaped to be able to provide an environmental region on the side of and behind the motor vehicle with a larger field of view than with a non-convex rearview mirror. The consequence of the convex rearview mirror is that a driver of the motor vehicle perceives objects in a mirror image of the convex rearview mirror with a larger distance to the motor vehicle than it would be the case with a non-convex rearview mirror. In order to make the driver aware of the distorted mapping of the object, for example, a lettering is attached to the edge of the rearview mirror as safety information, however, by which the fact of the distorted mapping is brought to mind to a user only in written manner and only in very restricted manner. For example, the rearview mirror can be formed as an exterior mirror respectively as a wing mirror or as an interior mirror.

It is the object of the invention to provide a method, a driver assistance system as well as a motor vehicle, by which or in which the safety information can be presented to a user in very catchy and vivid manner.

According to the invention, this object is solved by a method, by a driver assistance system as well as by a motor vehicle having the features according to the respective independent claims.

In a method according to the invention, in particular pictorial, safety information is presented on a display device of a motor vehicle. The motor vehicle includes an environment imaging device, by which an object in an environmental region of the motor vehicle is pictorially captured. According to the invention, it is provided that a distortion demonstration constructed of images is presented on the display device as safety information. The distortion demonstration describes a deviation of a distorted mapping of the object causally generated by the environment imaging device to an undistorted mapping of the object compared thereto. At least one distorted mapping is displayed as an image and at least one undistorted mapping is displayed as a further image on the display device.

By the distortion demonstration, thus, it is pictorially clarified or reproduced how the difference between the distorted mapping and the actual undistorted mapping is.

By the method according to the invention, it becomes possible to present to a driver of the motor vehicle in particularly vivid manner how the distorted mapping differs from the undistorted mapping.

By the distortion of the mapping causally generated in particular by the environment imaging device, the distortion degree is also known since the distortion in this case expectably occurs depending on components or by the in particular intentionally distorting configuration of at least one component of the environment imaging device. Since this distortion is therefore also easily comprehensible in its effect, the undistorted mapping can also be exactly presented to this.

In particular, by the distortion of the mapping, a mapping extending the field of view is also generated and presented, wherein this extension of field of view is in particular achieved especially by the distorting acting configuration of the environment capturing device. It can be provided that the undistorted mapping only presents the field of view area restricted in comparison or else also presents the extended field of view area.

Thus, the distorted mapping can for example be causally generated by a rearview mirror of the motor vehicle with a convexly shaped mirror surface. In contrast to this, the undistorted mapping is generated by a plane or non-curved mirror and/or rearview mirror of the motor vehicle. The convex rearview mirror is for example used if the environmental region, for example a rear environmental region and/or a lateral environmental region of the environmental region, is to be provided to the driver with a larger field of view. Due to the larger field of view, for example, distances of objects in the environmental region to other objects in the environmental region and/or to the motor vehicle are different in the distorted mapping compared to the undistorted mapping. Thus, with such convex mirrors, the advantage of enlargement of field of view is associated with the disadvantage of the mapping distortion.

However, the distorted mapping can also be provided by a camera as the environment imaging device. Thus, the camera for example has a lens, in particular a fish-eye lens, to capture the environmental region in particularly ample manner or to capture a particularly large field of view of the environmental region. Now, if the field of view is larger than it can be presented on the display device, thus, the distorted mapping is also displayed on the display device. Thus, any mapping of the object and/or the environmental region is understood by the distorted mapping of the object, which gives a false or distorted impression of the current environmental situation to the driver.

The at least two images of the distorted and the undistorted mapping, thus at least the image and the further image, can be displayed on the display device at the same time and/or next to each other.

Furthermore, it may be that the user's attention is not adequately drawn to the scene in the environmental region due to the distorted representation. The perception of the environmental region by the driver can thus be reduced. This can be confusing for the driver and leads to an unsafe driving of the motor vehicle. By the distortion demonstration this circumstance is clearly and memorably pointed out to the driver.

In particular, it is provided that the distorted mapping is characterized by a distorted size ratio of the object, in particular compared to other objects in the environmental region, and/or a distorted distance of the object to the motor vehicle and/or by a distorted distance of the object to a further object in the environmental region compared to the undistorted mapping. In the distorted mapping, the size of the object is thus for example smaller than it is in the undistorted mapping. This can be transferred to further objects in the environmental region in analogous manner, which thus all have a distorted appearance in the distorted mapping compared to the undistorted mapping. Analogously, this can also apply to the distorted distance. Thus, the object in the distorted mapping can be located closer or farther away with respect to the motor vehicle in the distorted mapping. Thus, it is advantageous that the driver gets presented in particularly vivid manner based on the distortion demonstration, how the distorted mapping, which is generated by the environment imaging device, has to be interpreted or understood. Thus, the driver is made aware in particularly vivid manner that the size ratio of the object and/or the distance of the object to the motor vehicle is distorted and thus does not correspond to the size ratio and/or the distance, which the driver would perceive if the object is viewed without the environment imaging device and without further environment imaging device.

Preferably, it is provided that the object, in particular another traffic participant, is captured in an environmental region of the environmental region lateral with respect to the motor vehicle and/or in an environmental region of the environmental region rearward with respect to the motor vehicle. The advantage is in that the driver usually is sitting oriented forward in the motor vehicle and thus cannot see the lateral environmental region and/or the rear environmental region, thus the environmental region besides the motor vehicle and/or the environmental region behind the motor vehicle, or can only see it in restricted manner without using the environment imaging device. The environment imaging device can therefore provide the distorted mapping of the lateral environmental region and/or of the rear environmental region to the driver such that he is able to keep his attention or his field of view substantially oriented forward or towards the forward direction of travel.

Furthermore, it is provided that the environment imaging device is formed with at least one rearview mirror on the motor vehicle side, which includes a non-electronic mirror and provides the distorted mapping as a mirror image. The environment imaging device can also be formed as a wing mirror and thus as a special configuration of the rearview mirror. In this case, the mirror of the rearview mirror is responsible for the distorted mapping. The mirror as a reflecting surface thus reflects light incident from the environmental region such that it can be acquired by the driver of the motor vehicle.

Furthermore, it is preferably provided that the environment imaging device is formed with at least one electronic rearview mirror on the motor vehicle side, which includes a camera and provides the distorted mapping. This means that the rearview mirror is arranged on the motor vehicle. For example, the electronic rearview mirror can also be referred to as "eMirror". Furthermore, the electronic rearview mirror can replace the non-electronic rearview mirror such that the electronic rearview mirror is then exclusively formed by one or more cameras, but without the non-electronic mirror surface, and attached to the motor vehicle. The functional principle of the electronic rearview mirror is that the environmental region, in particular the lateral environmental region and/or the rear environmental region, is captured by means of at least one camera and displayed on at least one display device of the motor vehicle, in particular a display device within the motor vehicle. The distorted mapping by the electronic rearview mirror for example arises due to the lens of the camera and/or due to required image transformations of the distorted mapping to display it on the display device of the motor vehicle. Thus, the image transformation can for example be required if an aspect ratio of the image captured by the camera does not correspond to the aspect ratio of the display device and/or if a field of view of the camera with respect to a horizontal angle and/or a vertical angle is larger or smaller than it can be displayed on the display device with vertical and horizontal dimensions. Thus, the camera with a fish-eye lens for example captures a field of view with a horizontal angle of up to 180° and more, which strictly speaking thus has to be described spherically with a hemisphere. In order to present this sphere, which is three-dimensional, on the display device in two-dimensional manner, the image transformation is also required.

Preferably, it is provided that the distortion demonstration is displayed in a demonstration mode of a driver assistance system of the motor vehicle and a distortion demonstration including the safety information is not displayed in a normal operating mode of the driver assistance system different from the demonstration mode. The demonstration mode, in which the distortion demonstration is displayed on the display device, is therefore a temporary state. However, if the safety information is not displayed on the display device, thus, the driver assistance system is in the normal operating mode. In the normal operating mode, thus, the distorted mapping or the image of the distorted mapping can for example be displayed on the display device to provide a functionality of the electronic rearview mirror.

Preferably, it is provided that the distortion demonstration is presented by an image sequence with a continuous succession of frames. In this image sequence, a first frame can correspond to the distorted mapping and a last frame of the image sequence can correspond to the undistorted mapping. Alternatively, in this image sequence, a first frame can correspond to the undistorted mapping and a last frame of the image sequence can correspond to the distorted mapping. The advantage of the image sequence is that the distortion demonstration can run as a fluent film or as a fluent video. Furthermore, the deviation between the mappings is thereby even more clearly recognizable for an observer and is more sustainably comprehensible and memorable. In particular, the image succession of the image sequence can run at a frequency of 30 Hertz or 60 Hertz or more. Alternatively, the image succession of the image sequence can for example run with 25 Hertz in a frequency, which seems to be fluent to a human observer. However, the image succession can also display the frames with less than 25 Hertz to give more time to the human observer or the driver to acquire or comprehend the respective frame. The image sequence can for example extend over several seconds.

Furthermore, it is preferably provided that the distortion demonstration is performed stepwise from the undistorted mapping of the object towards the distorted mapping of the object based on the image sequence. Thus, a morphing or an image metamorphosis can here for example be effected, in which it is begun with the undistorted mapping and the following frames of the image sequence change stepwise, thus from frame to frame, such that the distorted mapping is presented after a predetermined number of frames. Similarly, this is possible in the reverse order such that the distortion demonstration is performed stepwise from the distorted mapping of the object towards the undistorted mapping of the object based on the image sequence. In the morphing, the image is transferred into the further image by employment of additional specific distortions. Therein, one attempts to generate a transition as realistic as possible to the further image starting from the image. In the stepwise performed distortion demonstration, a particularly vivid and/or memorable and/or comprehensible safety information for the driver is advantageous.

Furthermore, it is in particular provided that a distortion behavior of the environment imaging device in the normal operating mode thereof is checked, and upon variation of the distortion behavior, the distortion demonstration is adapted to the current distortion behavior. Thus, the environment imaging device, in particular if it is formed as an electronic rearview mirror, can deviate from an original distortion behavior in certain driving situations. The environment imaging device is then changed in its adjustment, for example by changing a focusing of the camera. The certain driving situation can for example be a slow driving maneuver in a procedure of entering and/or exiting a parking lot. Thus, in a procedure of entering a parking lot and/or exiting a parking lot, usually the interest to objects disposed relatively far from the motor vehicle becomes lower and the interest to objects or obstacles disposed relatively close to the motor vehicle becomes greater. Thus, the camera of the electronic rearview mirror can for example be configured such that in this case the focus and/or a corresponding focal length adjustment is selected such that the objects relatively close to the motor vehicle are considered with particular interest in capturing by the camera. In the non-electronic rearview mirror, for example, the reflecting mirror surface can be tilted in order that objects important to the parking procedure, for example a curb, can be better captured. If now the distortion behavior of the environment imaging device changes for example by changing the focal length, thus, it is provided that the distortion demonstration is adapted to the current distortion behavior. Wherein this is effected without the simultaneous display of the distortion demonstration. Only in a subsequent demonstration mode, the adapted distortion demonstration is then output on the display device to describe also the changed configuration of the electronic rearview mirror and thus the changed distorted mapping to the driver in vivid manner. It is advantageous that the distortion demonstration thus can be reliably and/or precisely presented even in certain driving maneuvers, in particular slow driving maneuvers. It can also be provided that upon such a change of the distortion behavior, in particular after terminating the adaptation of the distortion demonstration, the vehicle occupant is made aware of an updated distortion demonstration, and the vehicle occupant can also start himself the display of this distortion demonstration.

In particular, it is provided that the distortion demonstration is shown on the display device depending on a specific operating situation of the motor vehicle. Thus, a predetermined point of time can be determined by the specific operating situation, at which the distortion demonstration is displayed on the display device. Thus, it can for example also be provided that the specific operating situation includes multiple predetermined specific operating states of the motor vehicle.

Furthermore, it is preferably provided that an activation of an ignition of the motor vehicle and/or starting the motor vehicle and/or switching on the environment imaging device and/or recognition of an effected and just terminated seat occupation of the motor vehicle by a person is preset as the specific operating situation. Thus, it can be provided that the distortion demonstration is shown if it is determined that a seat in the motor vehicle has just been occupied by a person. Thus, it is advantageous that the specific operating situations preferably take place when the driver substantially has not yet used the distorted image or the distorted mapping and thus the environment capturing device. Furthermore, it is advantageous to show the distortion demonstration when the motor vehicle is not yet moved, thus at the beginning of a travel with the motor vehicle.

Furthermore, it is provided that the distortion demonstration is automatically started upon satisfaction of the specific operating situation. The distortion demonstration can therefore automatically proceed without the driver or another person in the motor vehicle having to actively generate a start signal. This has the advantage of increased comfort because the driver does not have to manually activate the distortion demonstration.

In a further embodiment, it is provided that a user-initiated premature termination of the presentation of the distortion demonstration is prevented. This means, if the distortion demonstration is already started and/or is to be automatically started due to the specific operating state, thus, the user or the driver or another person in the motor vehicle cannot effect the premature termination, thus the termination of the distortion demonstration before the last frame and the further image have been shown, respectively. Thus, it is advantageous that the driver must get completely displayed the safety information or the distortion demonstration.

The invention also relates to a driver assistance system for a motor vehicle with an environment imaging device and a display device, which is adapted to perform a method according to the invention.

A motor vehicle according to the invention, in particular a passenger car, includes a driver assistance system according to the invention.

The preferred embodiments presented with respect to the method according to the invention and the advantages thereof correspondingly apply to the driver assistance system according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone, without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim.

Below, embodiments of the invention are explained in more detail based on schematic drawings.

Figure 2:
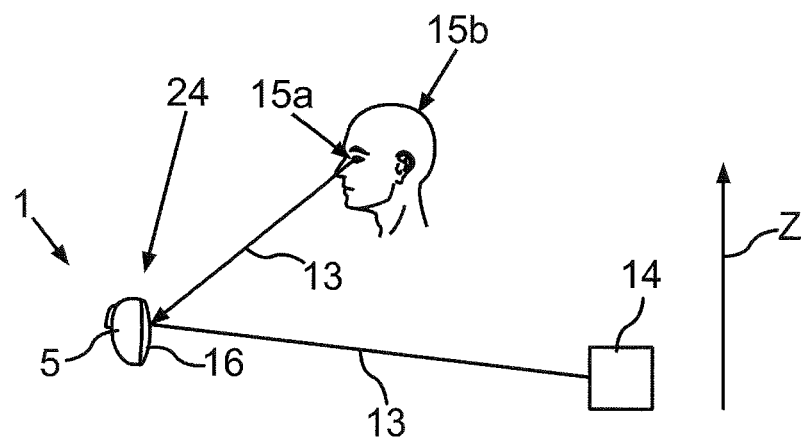
Figure 3:
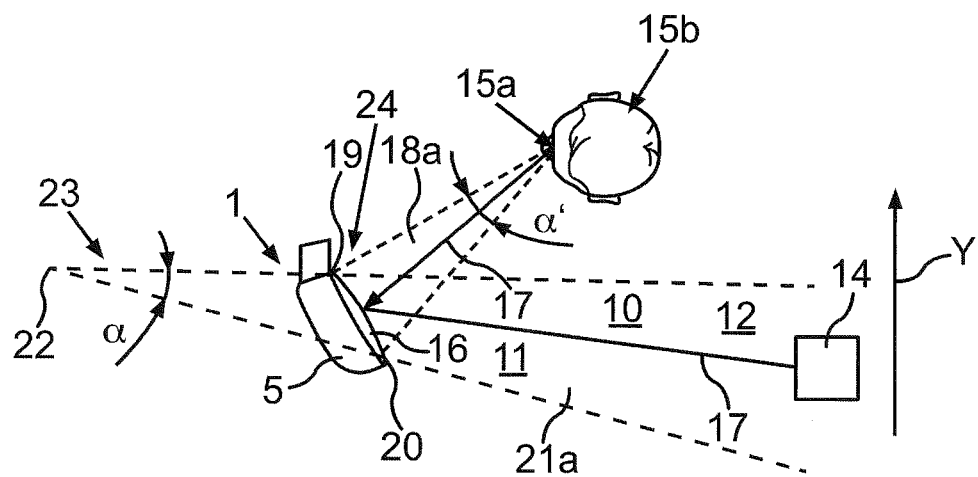
Figure 4:
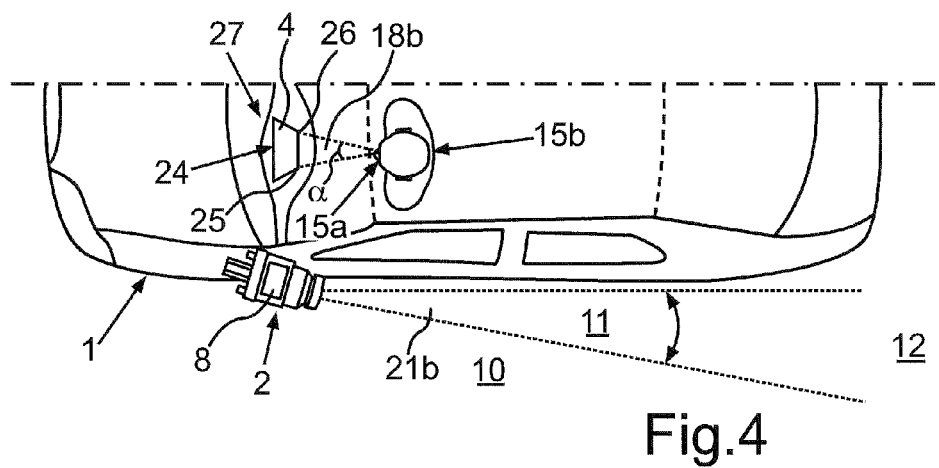
Figure 5:
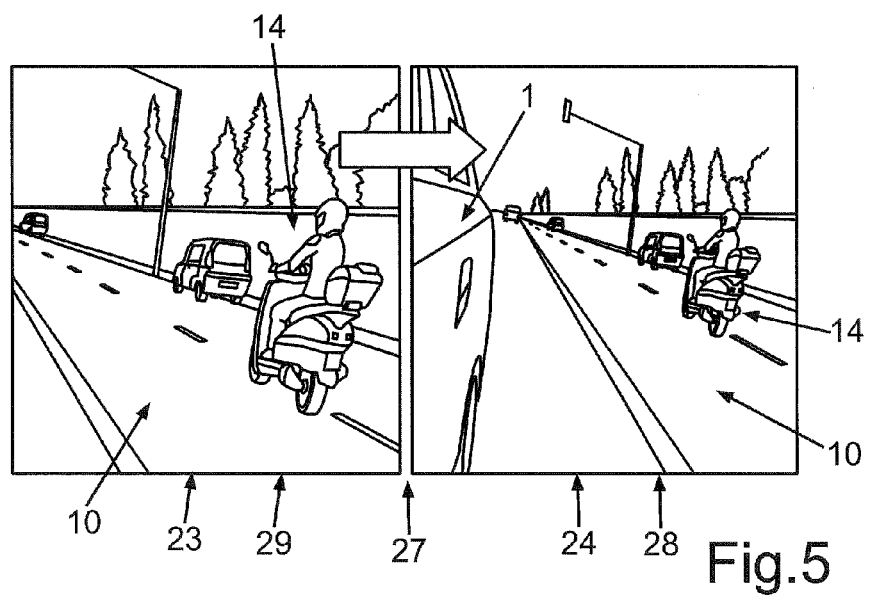
Figure 6:
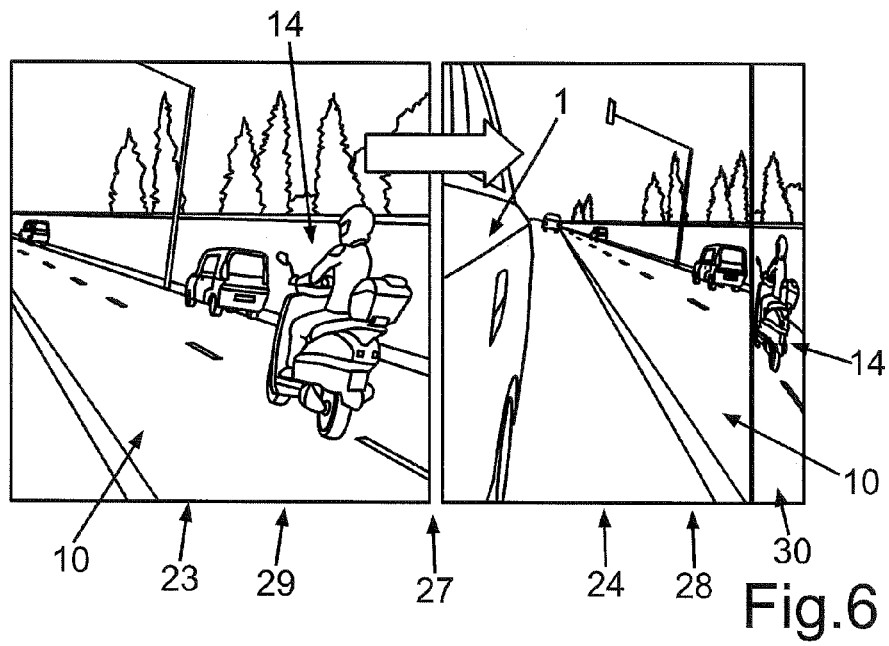
Figure 7:
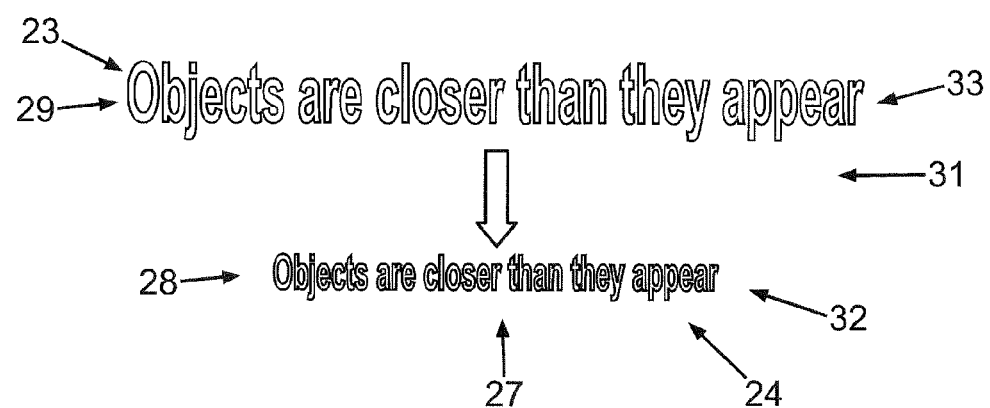

There show:

FIG. 1 in schematic plan view an embodiment of a motor vehicle according to the invention with a driver assistance system;

FIG. 2 in schematic illustration a vertical optical path, which extends from an object in an environmental region of the motor vehicle via a rearview mirror formed as a wing mirror of the motor vehicle towards a human eye of a driver of the motor vehicle;

FIG. 3 in schematic illustration a horizontal optical path extending from the object via the wing mirror towards the human eye;

FIG. 4 in schematic illustration the motor vehicle with an electronic wing mirror and a display device;

FIG. 5 in schematic illustration a distortion demonstration with a distorted mapping and an undistorted mapping;

FIG. 6 in schematic illustration a further distortion demonstration with a distorted mapping and an undistorted mapping; and FIG. 7 in schematic illustration a further distortion demonstration based on a lettering.

In FIG. 1, a plan view of a motor vehicle 1 with a driver assistance system 2 according to an embodiment of the invention is schematically illustrated. In the embodiment, the driver assistance system 2 includes a processing unit 3 and a display device 4. The display device 4 can for example be a display or a monitor. Furthermore, in the embodiment, the driver assistance system 2 includes a left wing mirror 5 and a right wing mirror 6 with respect to the forward direction of travel of the motor vehicle 1 as respective rearview mirrors. The left wing mirror 5 and the right wing mirror 6 are for example non-electronic rearview mirrors, which provide a mirror image by a non-electronic mirror. Additionally to or instead of this, the driver assistance system 2 includes an electronic wing mirror 7 as an embodiment of an electronic rearview mirror, which is also known as "eMirror" or "Camera Monitoring System" (CMS). The electronic wing mirror 7 in turn includes in particular a left camera 8 and a right camera 9. Furthermore, the electronic wing mirror 7 can have a plurality of display devices not illustrated in more detail, which can for example be disposed within the motor vehicle 1. The plurality of the display devices can for example also include the display device 4.

The left camera 8 and the right camera 9 are CMOS (complementary metal-oxide-semiconductor) cameras or else CCD (charge-coupled device) cameras or any image capturing devices, which are able to provide a frame from the environmental region 10 of the motor vehicle 1. Multiple such cameras 8, 9 can also be employed. The cameras 8, 9 are video cameras, which continuously provide an image sequence of frames. The processing unit 3 then processes the image sequence of the frames for example in real time. The processing unit 3 can for example be disposed within the respective camera 8, 9 or outside of the respective camera 8, 9 in any other position within the motor vehicle 1 as a unit separate from the camera 8, 9.

The left camera 8 and the right camera 9 capture a lateral environmental region 11 of the environmental region 10 with respect to the forward direction of travel of the motor vehicle 1 and a rear environmental region 12 of the environmental region 10 with respect to the forward direction of travel of the motor vehicle 1 according to the embodiment. The environmental region 10 captured by the left camera 8 and/or the right camera 9 is then for example displayed on one or more of the plurality of display devices and/or the display device 4.

FIG. 2 shows a vertical optical path 13 from an object 14 in the environmental region 10 via the left wing mirror 5 towards a human eye 15a of a driver 15b of the motor vehicle 1. The left wing mirror 5 includes a convex mirror surface 16. The vertical optical path 13 in FIG. 2 is described in vehicle vertical direction Z. The vehicle vertical direction Z thus extends perpendicularly to a roadway of the environmental region 10. The vertical optical path 13 shows the light incidence from the object 14 to the human eye 15a as it arises with lateral view of the motor vehicle 1. The lateral view of the motor vehicle 1 means that an observer looks perpendicularly to the vehicle vertical direction Z and perpendicularly to a vehicle longitudinal axis of the motor vehicle 1.

FIG. 3 shows a horizontal optical path 17, which extends from the object 14 via the left wing mirror 5 to the human eye 15a. The horizontal optical path 17 extends in a vehicle transverse plane Y, which extends perpendicularly to the vehicle vertical plane Z of the motor vehicle 1. The horizontal optical path 17 shows the light incidence from the object 14 to the human eye 15a as it arises in plan view of the motor vehicle 1. The plan view of the motor vehicle 1 means that an observer looks perpendicularly to the roadway and perpendicularly to the vehicle longitudinal axis. In the vehicle transverse plane Y, a first field of view 18a extends from the human eye 15a to a right edge 19 of the left wing mirror 5 and also from the human eye 15a to a left edge 20 of the left wing mirror 5. The circular segment of the first field of view 18a from the left edge 20 to the right edge 19 with the human eye 15a as center of the circle is described by an angle α'. A second field of view 21a extends starting from a point of origin 22 over the right edge 19 and also from the point of origin 22 over the left edge 20. The position of the point of origin 22 depends on the degree of convexity of the convex mirror surface 16. The more convex the convex mirror surface 16 is, that means the more severely convexly curved, the closer the point of origin 22 is on the left wing mirror 5. The second field of view 21a sweeps a circular segment with the angle α with respect to the point of origin 22 as the center of the circle. The object 14 is—according to FIG. 3—in the second field of view 21a. If the object 14 is now acquired without an environment imaging device 5, 6, 7 as the left wing mirror 5, thus, it can be referred to an undistorted mapping 23. If the object 14 is viewed or imaged with the environment imaging device 5, 6, 7—as for example the left wing mirror 5—thus, it can be referred to a distorted mapping 24. The distorted mapping 24 thus arises according to FIG. 3 in the embodiment in particular by the convex mirror surface 16, which images the object 14 smaller from the human eye 15a than if the object 14 would be viewed from the point of origin 22.

In order to be able to determine a size ratio M of the object 14 in the distorted mapping 24 to the object 14 in the undistorted mapping 23, a ratio of the angle α of the first field of view 18a and the angle α' of the second field of view 21a is calculated. This can be mathematically described as follows:

$$\left| M = \frac{\alpha'}{\alpha} \right.$$

FIG. 4 shows the motor vehicle 1 with the left camera 8 and the display device 4. From the left camera 8, a second camera field of view 21b extends analogously to the second field of view 21a. The second camera field of view 21b depends on a lens of the left camera 8 and/or a focal length of the left camera 8. The second camera field of view 21b is also described with the angle α with respect to the swept circular segment. Furthermore, FIG. 4 shows a first camera field of view 18b, which is swept from the human eye 15a to a left display device edge 25 of the display device 4 and from the human eye 15a to a right display device edge 26 of the display device 4. The left display device edge 25 and the right display device edge 26 are in the vehicle transverse plane Y according to the embodiment. Thus, in the electronic wing mirror 7 or the "eMirror", the same mathematical principle can be used to determine the size ratio M as in the wing mirror 5, 6 from FIG. 2 and FIG. 3.

According to FIG. 4, the distorted mapping 24 is displayed on the display device 4.

In order to describe the distorted mapping 24 on the display device 4 in vivid manner to the driver 15b and to demonstrate the difference to the undistorted mapping 23, a distortion demonstration 27 is presented on the display device 4 as safety information in a demonstration mode of the system, which describes a deviation of the distorted mapping 24 generated by the environment imaging device 5, 6, 7, thus according to the embodiment the left wing mirror 5 and/or the right wing mirror 6 and/or the electronic wing mirror 7. As the difference from the distorted mapping 24 to the undistorted mapping 23, the size ratio M and/or a distance from the object 14 to the motor vehicle 1 and/or a distance from the object 14 to the further object different from the object 14 can be described.

For example, the demonstration mode is started depending on a specific operating situation of the motor vehicle 1, for example of the driver assistance system 2. Thus, it can for example be provided that the driver 15b enters the motor vehicle 1 and activates the ignition of the motor vehicle 1. The activation of the ignition is preferably a specific operating situation, wherefore thereby the demonstration mode is started and the presentation of the distortion demonstration 27 on the display device 4 is effected. By the distortion demonstration 27, the driver 15b is made aware of and gets vividly presented how the distorted mapping 24 distorted due to the environment imaging device 5, 6, 7 differs from the undistorted mapping 23. After the end of the distortion demonstration 27, the demonstration mode also ends and the normal operation mode begins in particular shortly after or time-delayed to it.

FIG. 5 shows an embodiment of the distortion demonstration 27. In the distortion demonstration 27 according to FIG. 5, the undistorted mapping 23 is presented in the left image half, while the distorted mapping 24 is presented in the right image half. It is shown that the object 14—a cyclist according to FIG. 5—is presented farther away in the distorted mapping 24, thus with a greater distance to the motor vehicle 1 than it is the case in the undistorted mapping 23.

The distortion demonstration 27 for example shows an image sequence to the driver 15b on the display device 4, but at least one image 28 of the distorted mapping 24 and a further image 29 of the undistorted mapping 23.

FIG. 6 shows the distortion demonstration 27, wherein a wide-angle area 30 is shown in the image 28, thus the distorted mapping 24. The wide-angle area 30 results in an additional distortion of the distorted mapping 24. The wide-angle area 30 can for example be provided as an additional area of the wing mirror 5, 6. The purpose of the wide-angle area 30 is in increasing the second field of view 21a. However, further distortions arise by the wide-angle area 30, which are even more difficult to comprehend for the driver 15b than the distortions in the distorted mapping 24 without the wide-angle area 30. The distortion demonstration 27 is therefore particularly helpful according to the embodiment of FIG. 6. The wing mirror 5, 6 with the wide-angle area 30 is bisected according to the embodiment of FIG. 6, wherein the wide-angle area 30 is disposed on the right side of the image 28.

Similarly, the wide-angle area 30 can be provided via a separate wing mirror supplementing the wing mirror 5, 6.

FIG. 7 shows the distortion demonstration 27 based on a lettering 31. As an example for the distorted mapping 24, a distorted lettering 32 of the lettering 31 is shown and as an example or demonstration of the undistorted mapping 23, an undistorted lettering 33 of the lettering 31 is shown on the display device 4. Based on the lettering 31, the distortion demonstration 27 can also be displayed to the driver 15b on the display device 4.

The circumstances described based on FIG. 2 and FIG. 3 with respect to the left wing mirror 5 correspondingly also apply to the right wing mirror 6. Analogously to this, the described circumstances of FIG. 4 with respect to the left camera 8 similarly apply to the right camera 9 as well as to all of further cameras of the motor vehicle 1. The further cameras of the motor vehicle 1 providing the distorted mapping 24 can for example be a part of another camera system of the motor vehicle 1, such as for example an environmental vision system and/or a reversing vision system and/or a plan view system. The further camera systems also provide the distorted mapping 24 and therefore can be operated in a distortion demonstration mode, which describes the period of time, in which the distortion demonstration 27 is presented on the display device 4.

The invention claimed is:

1. A method for presenting safety information on a display device of a motor vehicle, the motor vehicle having an environment imaging device, the method comprising:
    pictorially capturing, by the environment imaging device, an object in an environmental region of the motor vehicle; and
    presenting a distortion demonstration on the display device as safety information, wherein the distortion demonstration comprises a deviation of a distorted mapping of the object causally generated by the environment imaging device to an undistorted mapping of the object compared thereto,
    wherein the distorted mapping is displayed as an image and the undistorted mapping is displayed as a further image on the display device, and
    wherein the distortion demonstration is displayed in a demonstration mode of a driver assistance system of the motor vehicle and a distortion demonstration including the safety information is not displayed in a normal operating mode of the driver assistance system different from the demonstration mode, the demonstration mode being configured to present to a driver of the motor vehicle a difference between the distorted mapping of the object and the undistorted mapping of the object.

2. The method according to claim 1, wherein the distorted mapping is characterized by one selected from the group consisting of: a distorted size ratio of the object, a distorted distance of the object to the motor vehicle, and a distorted distance of the object to a further object in the environmental region compared to the undistorted mapping.

3. The method according to claim 1, wherein the object comprises another traffic participant and is captured in an environmental region of the environmental region lateral with respect to the motor vehicle and/or in the environmental region rearward with respect to the motor vehicle.

4. The method according to claim 1, wherein the environment imaging device is formed with at least one rearview mirror on the motor vehicle side, which includes a non-electronic mirror and provides the distorted mapping as a mirror image.

5. The method according to claim 1, wherein the environment imaging device is formed with at least one electronic rearview mirror on the motor vehicle side, which includes a camera and provides the distorted mapping.

6. The method according to claim 1, wherein the distortion demonstration is presented by an image sequence with a continuous succession of frames.

7. The method according to claim 6, wherein the distortion demonstration is performed stepwise from the undistorted mapping of the object towards the distorted mapping of the object based on the image sequence.

8. The method according to claim 1, wherein a distortion behavior of the environment imaging device in the normal operating mode of the driver assistance system including the environment imaging device is checked and upon change of the distortion behavior, the distortion demonstration is adapted to the current distortion behavior.

9. The method according to claim 1, wherein the distortion demonstration is shown on the display device depending on a specific operating situation of the motor vehicle.

10. The method according to claim 9, wherein one of an activation of an ignition of the motor vehicle, starting the motor vehicle, switching on the environment imaging device, and/or recognition of an occurring seat occupation of the motor vehicle by a person is preset as the specific operating situation.

11. The method according to claim 9, wherein the distortion demonstration is automatically started upon satisfaction of the specific operating situation.

12. The method according to claim 1, wherein a user-initiated premature termination of the presentation of the distortion demonstration is prevented.

13. A driver assistance system for a motor vehicle including an environment imaging device and a display device, which is adapted to perform a method according to claim 1.

14. A motor vehicle with a driver assistance system according to claim 13.

* * * * *